March 28, 1939.  D. G. RENNO  2,152,568
VEHICLE BODY
Filed Feb. 26, 1937   2 Sheets-Sheet 1
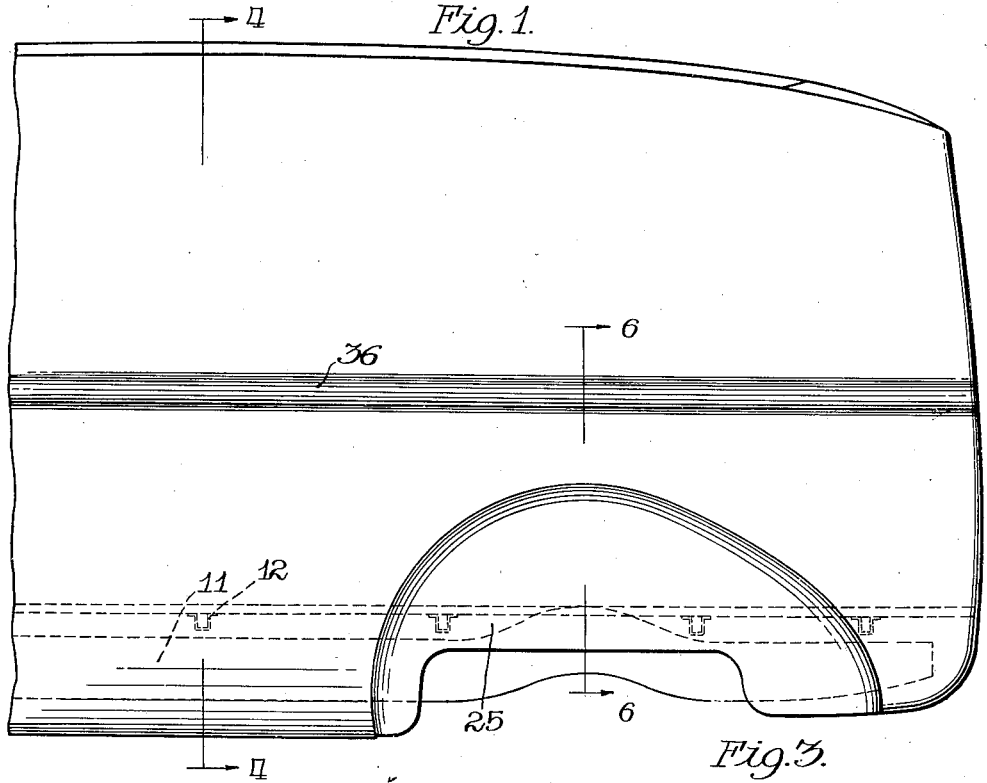
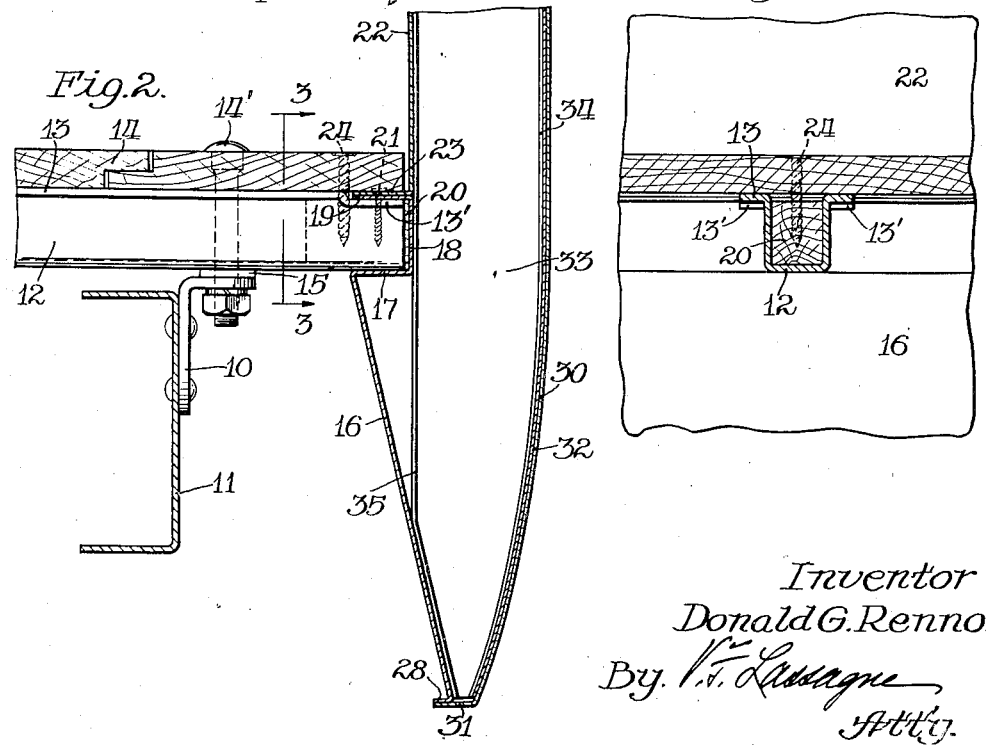
Inventor
Donald G. Renno.
By V. T. Lassagne
Atty.

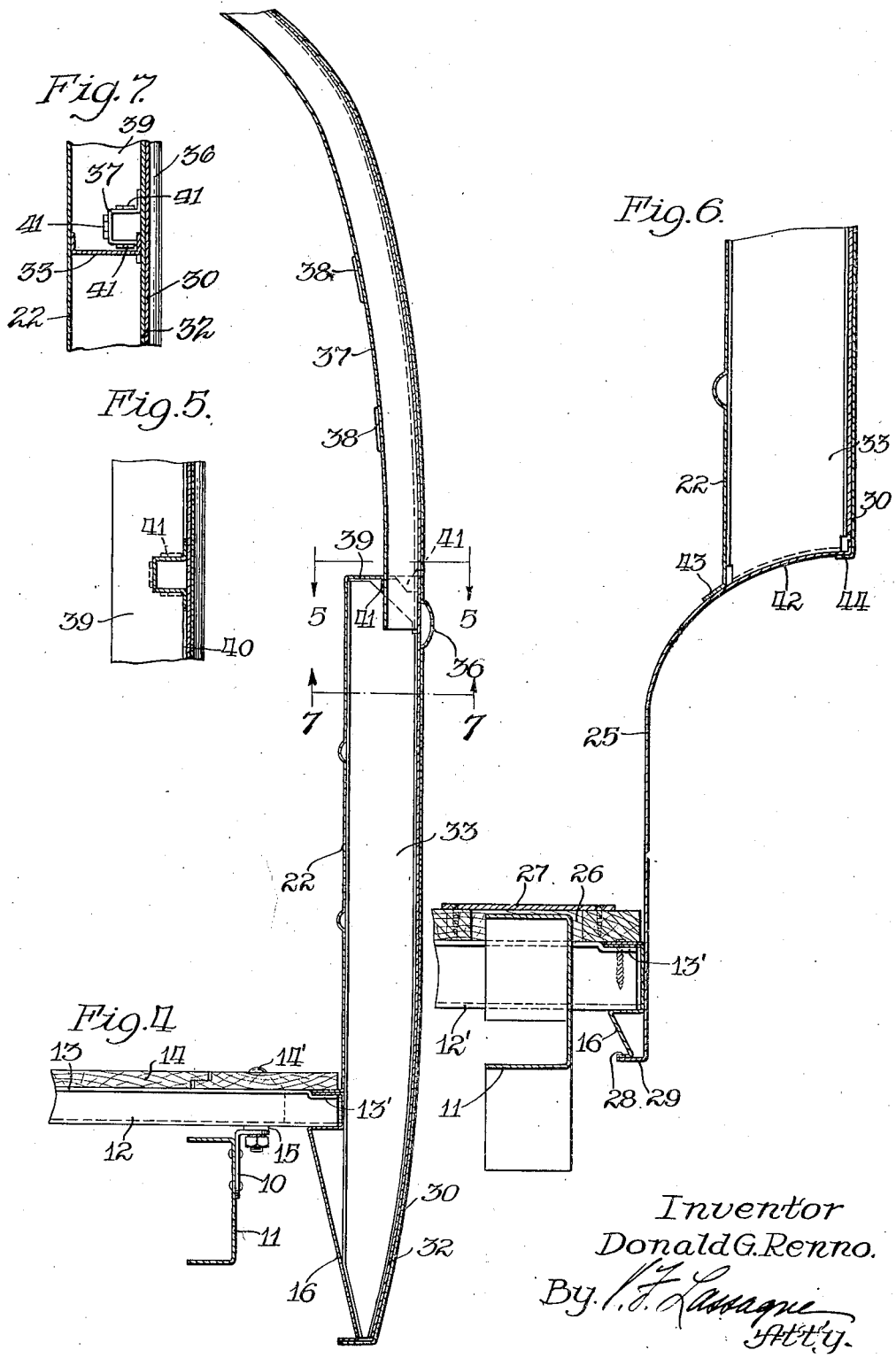

Patented Mar. 28, 1939

2,152,568

UNITED STATES PATENT OFFICE 2,152,568

VEHICLE BODY

Donald G. Renno, Fort Wayne, Ind., assignor to International Harvester Company, a corporation of New Jersey Application February 26, 1937, Serial No. 127,835

9 Claims. (Cl. 296—28)

This invention relates to a metal vehicle body construction. More specifically it relates to sheet metal construction by means of which a light weight and strong vehicle body may be fabricated.

The principal object of the invention is to simplify sheet metal body construction and to provide a strong and durable construction with a minimum amount of material.

Another object is to use the body panels and the reenforcing members, therefore, as structural units to replace frame members heretofore utilized.

The above objects and others, which will be apparent from the detailed description to follow, are accomplished by a construction in which an inner panel member is constructed to cooperate with sills to provide what might be termed as a frame-less panel body construction. The detailed construction by which the objects are accomplished are shown in the drawings, in which:

Figure 1 is a side elevation showing a panel truck body embodying the invention;

Figure 2 is an enlarged transverse vertical section showing the lower side construction of the body and the attaching means for the body on the frame of a truck;

Figure 3 is a section on the line 3—3 of Figure 2;

Figure 4 is a vertical transverse section on the line 4—4 of Figure 1;

Figure 5 is a horizontal section on the line 5—5 of Figure 4 showing only a short length of the side portion of the body;

Figure 6 is a section along the line 6—6 of Figure 1; and

Figure 7 is a section on the line 7—7 of Figure 4.

Panel bodies of the type illustrated are mounted directly on the side rails of truck frames without the interposition of longitudinal frame members. As illustrated, brackets 10 are riveted to the side rails 11. A plurality of the brackets are provided, one for each of the sills 12 of the panel body. Said sills are formed from metal with a bottom channel portion opening upwardly and with flanges 13 extending laterally from the upper portion of the channel in a horizontal plane. Floor boards 14 rest directly on the flanges 13 and are secured thereto by any suitable means. Pads 15 of resilient material are positioned between the brackets 10 and sills 12. Bolts 14', extending through the floor boards and through openings in the bottom of the sills 12, extend through openings in the brackets 10 and rigidly secure the sills to the vehicle frame. A lower sheet metal panel reenforcing and supporting member 16 is located below the sills slanting at an angle outwardly and over-lapping the sills a substantial distance, as best shown in Figures 2 and 4. At the upper end of said member, a horizontal portion 17 abuts the bottom of the sills. A continuation of the member forms a vertical portion 18 at the ends of the sills. A further continuation 19 extends horizontally resting on the top of the sills. It will be understood that the portions 17, 18 and 19 form a longitudinally extending channel which provides sufficient structural strength to assist in bracing the body between the sills.

In the end of each sill 12, a wood block 20 is fitted. Said block extends somewhat beyond the end of the sill, as best shown in Figure 2, and provides an abutment for the vertical portion 18. The block also forms a securing means for a drive screw 21 which extends through the horizontal portion 19 of the member 16. An inner reenforcing panel member 22 positioned vertically and extending upwardly is provided with a right angle flange 23 lying on the horizontal portion 19 to further reenforce said member and to provide structural strength. The drive screw 21 also extends through the flange 23. It will be noted that the outer end flanges on the sills 12 are provided with depressed portions 13' in order to take care of the two metal thicknesses positioned thereabove whereby a uniform level is provided for the outer floor boards.

As shown in Figure 2, a drive screw 24 extends through the outer floor board in the block 20. It will be understood that the construction at the end of each of the sills 12 is substantially the same where the sill extends entirely across the body.

In Figure 6, a section is shown at the location where the wheel housing is formed. A sheet metal housing member 25 is formed to provide for wheel clearance. The sill 12' at this point is shortened to provide for the necessary clearance. The member 16 is shortened at its lower end to provide for axle clearance. Its structure as extending around the end of the sill 12' is, however, the same as in the construction above described. The frame 11, as is conventional in vehicles of this type, extends upwardly over the axle housing adjacent the wheel housing to provide for the necessary clearance. An opening 26 is cut in the outer floor board whereby the frame may be brought substantially to the floor level. A plate 27 covers the opening 26.

The panel reenforcing and supporting member 16 is provided at its lower end with an inwardly extending flange 28. In the portion adjacent the wheel housing, as best shown in Figure 6, the wheel housing member 25 is secured to the flange 28 by an inturned flange 29. It is understood that these flanges may be secured by any suitable means preferably by spot welding.

An outer panel member 30, which forms the exterior surface of the body, extends downwardly to the extent of the member 16 and is provided with an inturned flange 31 which over-laps and is secured to the flange 28. The panel member 30 is shaped to provide for the proper curvature of the body and to allow sufficient space for reenforcing members between the end of the member 16. A layer of insulating material 32 is fitted within the panel 30 to reduce vibration and noise. A vertical reenforcing channel 33 is positioned with its outer flange 34 abutting the insulating material 32 and with its inner flange 35 abutting the inner panel 22 and the lower portion of the reenforcing member 16. Said inner flange 35 also abuts the vertical portion 18 of the member 16. The channel member 33 is secured by welding to the other members wherever found desirable. This construction is in wide use at the present time and the exact location of the welds have not been shown. The outer body panel 30 extends upwardly being curved inwardly at the top to form a body of the desired shape. A belt line 36 is formed by an outwardly pressed rib extending lengthwise of the panel. Flanged channel members 37 extend around the upper part of the panel 30 to form a roof support and downwardly a substantial distance along the outer panel terminating substantially adjacent the belt line of the body. Longitudinally extending guard rails 38 are secured to the channels 37.

The vertical reenforcing channels 33 terminate in overlapping relation with respect to the channels 37. The upper end 39 of the inner panel 22 is turned over at right angles extending over the tops of the members 33. Said turned over portion extends adjacent the outer panel and is provided with an upwardly extending flange 40 abutting the insulating material 32. Adjacent the channel 37, the horizontal wall portion 39 is provided with opening through which said channels extend. Downwardly extending flanges 41 stamped out of said wall portion are secured to the channels 37.

As shown in Figure 6, the vertical channel 33 over the wheel housing terminates in a flange 42, which is secured to the wheel housing 25. The inner panel member 22 at this point is provided with a flange 43 which is secured to the wheel housing. The outer panel 30 is provided with an inturned flange 44 which is secured to the outer edge of the wheel housing.

The construction of the panel body as above described is of a design which utilizes a minimum of material with a maximum of strength. The floor sills 12, as described, rests directly on the frame brackets 10. The floor 14 rests directly on the sills thereby bringing it as low as possible with respect to the vehicle frame. By forming the inner pannel member 22 and the lower member 16 with flanges, as described, sufficient strength is obtained by the box-like construction to carry the body without the usual longitudinal frame members. This construction also serves very satisfactorily for supporting an over-lapping outer panel which brings the apparent height of the body downwardly in conformance with modern design. The construction illustrated and described also provides the necessary reenforcing in the body to the required height combined with structural strength for supporting the body. By means of this construction, a very strong and durable body is obtained with a minimum amount of material. Although applicant has shown and described only a preferred embodiment of his improved sheet metal body construction, it is to be understood that he claims as his invention all modifications falling within the scope of the appended claims.

What is claimed is:

1. In a metal vehicle body, and in combination, transverse floor sills, a lower longitudinally extending sheet metal panel reenforcing member having an inwardly opening longitudinal channel at the upper edge formed with vertically spaced horizontal wall portions, said channel being fitted over the outer ends of the sills with the wall portions abutting the upper and lower portions of the sills, an inner panel reenforcing member provided with an inturned flange at the lower edge, said flange being mounted on the outer ends of the sills, and an outer panel member secured at the lower edge to the lower edge of the lower reenforcing member.

2. In a metal vehicle body, and in combination, floor sills consisting of metal channel-shaped members, a lower sheet metal panel reenforcing member having a longitudinal channel at the upper edge formed with vertically spaced horizontal wall portions, said channel being fitted over the outer ends of the sills, an inner panel reenforcing member provided with an inturned flange at the lower edge, said flange being mounted on the outer ends of the sills above the channel on the lower member, an outer panel member secured at its bottom edge to the bottom edge of the lower member, and a spacer member positioned between the outer panel member and the inner and lower reenforcing members.

3. In a metal vehicle body, and in combination, floor sills consisting of metal channel-shaped members, wood blocks fitted in the ends of said member, a lower sheet metal panel reenforcing and supporting member having a longitudinal channel at the upper edge formed with vertically spaced horizontal wall portions, said channel being fitted over the outer ends of the sills and secured to the wood blocks, an inner panel reenforcing member provided with an inturned flange at the lower edge, said flange being mounted on the outer ends of the sills above the channel on the lower member and secured to the wood block therewith, an outer panel member secured at its bottom edge to the bottom edge of the lower member, and a spacer member positioned between the outer panel member and the inner and lower panel reenforcing member and rigidly secured thereto.

4. In a metal vehicle body, and in combination, floor sills consisting of metal channel-shaped members with the open side of the channel at the top and with lateral extensions therefrom, a lower sheet metal panel reenforcing member having a longitudinal channel at the upper edge formed with vertically spaced horizontal wall portions, said channel being fitted over the outer ends of the sills, an inner panel reenforcing member provided with an inturned flange at the lower edge, said flange being mounted on the outer ends of the sills, and an outer panel member secured at its lower edge to the lower reenforcing member, a spacer member positioned between the outer panel member and the inner and lower panel members, the inner panel member being bent outwardly at its upper end into contact with the outer panel member.

5. In a metal vehicle body, and in combination, floor sills consisting of metal channel-shaped members with the open side of the channel at the top and with lateral extensions therefrom, a lower sheet metal panel reenforcing member having a longitudinal channel at the upper edge, formed with vertically spaced horizontal wall portions, said channel being fitted over the outer ends of the sills and being formed at its lower edge with an inturned flange, an inner panel reenforcing member provided with an inturned flange at the lower edge, said flange being mounted on the outer ends of the sills above the channel on the lower member, an outer panel member provided with an inturned flange at the lower edge secured to the flange on the lower member, a channel member positioned between the outer panel member and the inner and lower panel members for holding the members in spaced position, the inner panel member being bent outwardly at its upper end into contact with the outer panel member.

6. In a metal vehicle body, and in combination, transverse floor sills consisting of channel shaped metal members, a lower longitudinally and vertically extending sheet metal panel reenforcing and supporting member, said member being formed with an inwardly opening longitudinal channel having spaced horizontal wall portions, and a vertical wall portion connecting the horizontal portions, said horizontal portions being fitted over the outer ends of the sills and contacting the upper and lower walls thereof adjacent the ends, and an outer panel member secured to said supporting member.

7. In a metal vehicle body, and in combination, transverse floor sills, a lower vertically and longitudinally extending sheet metal panel reenforcing member, said member being formed with an inwardly opening longitudinal channel, said channel including a vertical wall and vertically spaced horizontal walls, said member being fitted over the ends of the floor sills with the upper wall lying in contact with the top sides of the sills adjacent the ends thereof and the lower wall abutting the lower sides of the sills adjacent the ends thereof, whereby said panel member resists forces from both vertical directions, and an outer panel member secured to said panel reenforcing member.

8. In a metal vehicle body, and in combination, transverse floor sills, a lower body wall construction including a longitudinal channel structure, said structure having vertically spaced, horizontal wall portions, said portions being fitted over the ends of the floor sills with the upper wall portion lying in contact with the top of the sills adjacent the ends thereof and with the lower wall portion abutting the lower sides of the sills adjacent the ends thereof whereby said channel structure resists forces in both vertical directions.

9. In a metal vehicle body, and in combination, transverse floor sills, a lower body wall construction including spaced sheet metal members, the inner member of which is formed as a longitudinal channel structure, said structure having vertically spaced, horizontal wall portions, said portions being fitted over the ends of the floor sills with the upper portion lying in contact with the top of the sills adjacent the ends thereof and a lower wall portion abutting the lower sides of the sills adjacent the ends thereof whereby said wall structure resists forces in both vertical directions.

DONALD G. RENNO.